Sept. 30, 1958

R. E. MILLER 2,853,926

MULTIPLE GUN MOUNTING AND RECOIL SYSTEM

Filed Dec. 18, 1956

INVENTOR.
ROBERT E. MILLER

BY *Wade Koontz*
ATTORNEY
*Arthur R. Parker*
AGENT

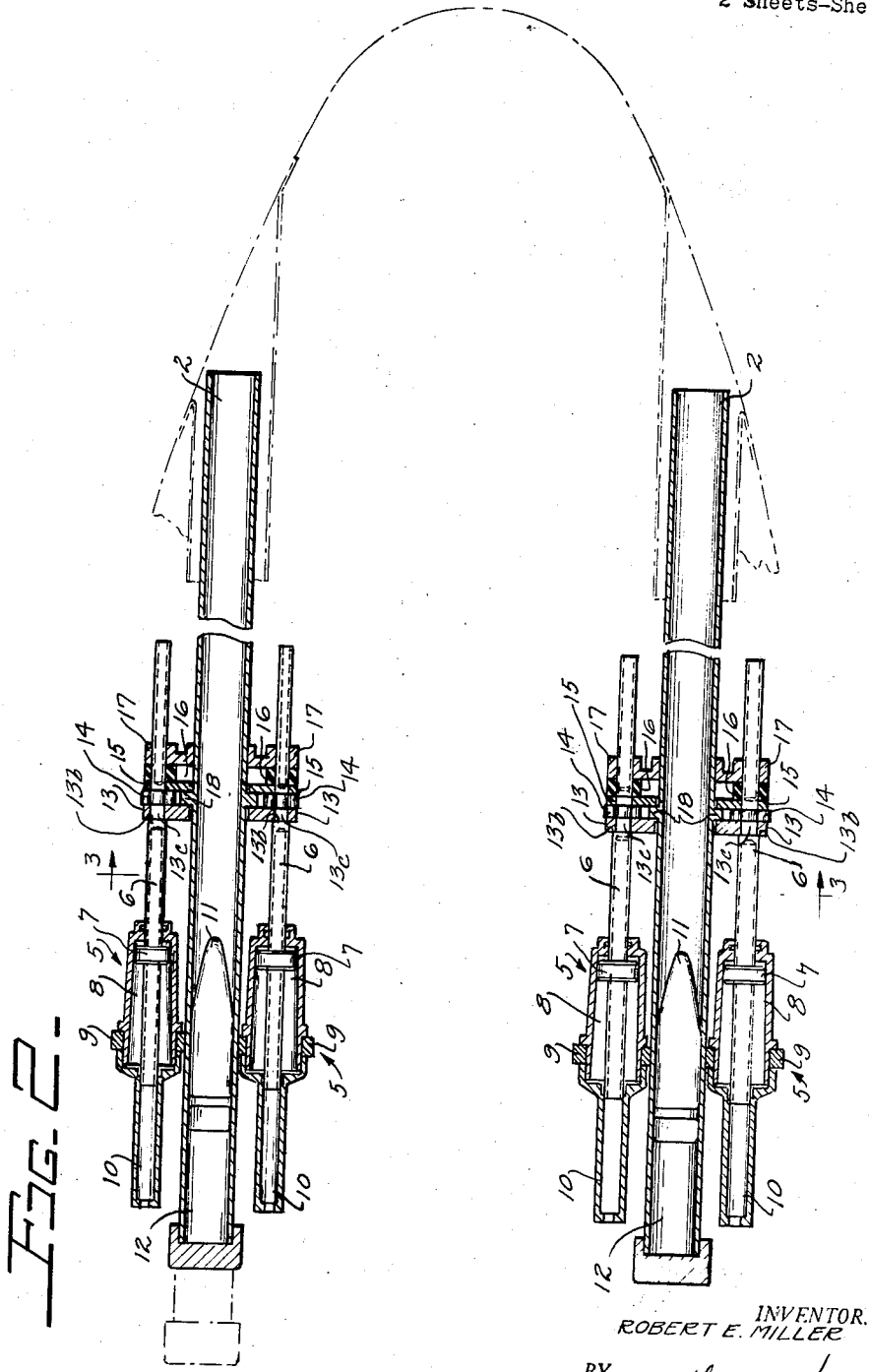

United States Patent Office 2,853,926
Patented Sept. 30, 1958

2,853,926

MULTIPLE GUN MOUNTING AND RECOIL SYSTEM

Robert E. Miller, Lombard, Ill., assignor to the United States of America as represented by the Secretary of the Air Force Application December 18, 1956, Serial No. 629,205

6 Claims. (Cl. 89—37.5)

This invention relates to a multiple barrel gun system for aircraft and, more particularly, to an improved recoil system for the effective absorption of the recoil shock of a plurality of guns fired one at a time in alternate succession.

In the continued development of modern aircraft weapons systems it has been found necessary to develop a recoil system which is effective and, yet simple in design. An important characteristic in such a system resides in the requirement that a minimum of additional weight should be added to the overall weight of the aircraft since a decided increase in said weight results in a substantial loss of aircraft performance. With the ever-increasing calibre of gun systems being utilized in said aircraft, some means of developing a design reduced to the least possible component parts and, yet, resulting in maximum effectiveness to absorb the shock of recoil has been effected by the gun system of the present invention.

It is an object of the invention, therefore, to provide a multiple barrel gun system for aircraft wherein an improved recoil system is incorporated.

It is a further object of the invention to provide a recoil system having a minimum of component parts and yet effective when utilized with a multiple gun system.

An additional object of the invention resides in the provision of a plurality of recoil brakes for use with each of a plurality of guns, said recoil brakes being so arranged so as to substantially reduce the number of required recoil brakes in the recoil system.

Another object of the invention is to provide a recoil system wherein adjacently mounted pairs of recoil brakes in said system serve as a recoil means for adjacently mounted gun tubes and thereby effect a substantial reduction in the weight of the overall recoil system.

A still further object of the invention provides a recoil brake so designed that a constant recoil reaction force is obtained.

Other objects and advantages of the invention will become apparent from the following description, taken in connection with the accompanying drawings in which like reference characters refer to like parts in the several figures:

Figure 2 is a partial longitudinal sectional view taken along 2—2 of Figure 3, illustrating details of the gun and recoil system utilized in the invention.

It is noted that the following description of the invention is made with reference to a specific gun system, namely, a multiple barrel, single shot, 57 mm., aircraft gun having a length of 103¼ inches and a recoil of 5 inches; however, the recoil system described hereinafter is not limited to said specific gun system but may be utilized with other gun systems without departing from the spirit or scope of the invention.

Figure 1:
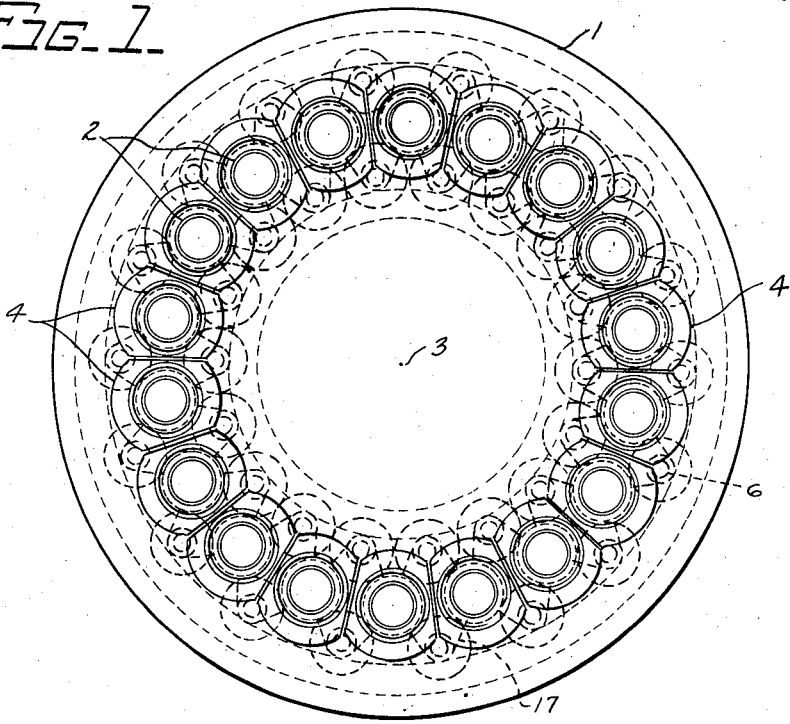
Figure 1 is a front view of the multiple barrel gun system of the invention, illustrating the arrangement of said system in the nose portion of an aircraft.

Referring particularly to Figure 1 of the drawings, the nose portion of an aircraft is generally indicated at 1. Said nose portion 1 is designed to incorporate structural elements capable of withstanding a force of 60,000 lbs. Positioned within said nose portion 1 fixed to fire directly to the front are mounted a plurality of gun tubes 2 equally spaced and circumferentially arranged around the longitudinal axis of said aircraft indicated generally at 3. Positioned in surrounding relation to each of said gun tubes 2 is a blast tube 4 adjacent to the forward or muzzle portion thereof. Each of said tubes 2 include a recoil system consisting of a plurality of recoil brakes indicated generally at 5 in Figure 2 and to be described hereinafter in detail.

With particular reference to Figure 2 of the drawings, the uppermost and lowermost gun tubes 2 are illustrated. The recoil system of the present invention consists of four identical hydraulic brakes generally indicated at 5 mounted between adjacent tubes 2 in pairs on a mounting bracket 13 as well as other structure to be described in detail hereinafter. Only two of said tubes 2 are illustrated in Figure 2 for each of said tubes. Each hydraulic brake 5 consists of a piston rod 6, a piston 7, and a cylinder 8 through which cylinder said piston rod 6 and piston 7 move during recoil subsequent to firing the tube. The cylinder 8 is tapered somewhat from its aft end to its forward end. Thus, the diameter is variable throughout the length of the cylinder so that a constant pressure of 5,000 p. s. i. acts on said piston 7 throughout its stroke during recoil. With this arrangement, a constant recoil reaction of 15,000 lbs. per cylinder or a total of 60,000 lbs. for the four (4) cylinders opposing the recoil of each tube 2 is obtained. Attached or sealed to the aft end of said cylinder 8 by means of the aft ring 9 is an air cylinder 10 which cylinder 10 is large enough to be in communication with the adjoining cylinder 8 of an adjacent recoil brake 5 and has sufficient capacity to return the system to battery after absorbing the recoil of said tube 2 subsequent to firing the gun. In each gun tube 2 is located the projectile 11 and the powder charge 12. On firing of any gun tube 2, the recoil stroke will last approximately 0.010 second with a constant reaction force of 15,000 lbs. per cylinder or 60,000 lbs. per gun tube. After recoil, each gun tube 2 is returned slowly to battery by the pressure of air in cylinders 8 and 10.

Figure 3:
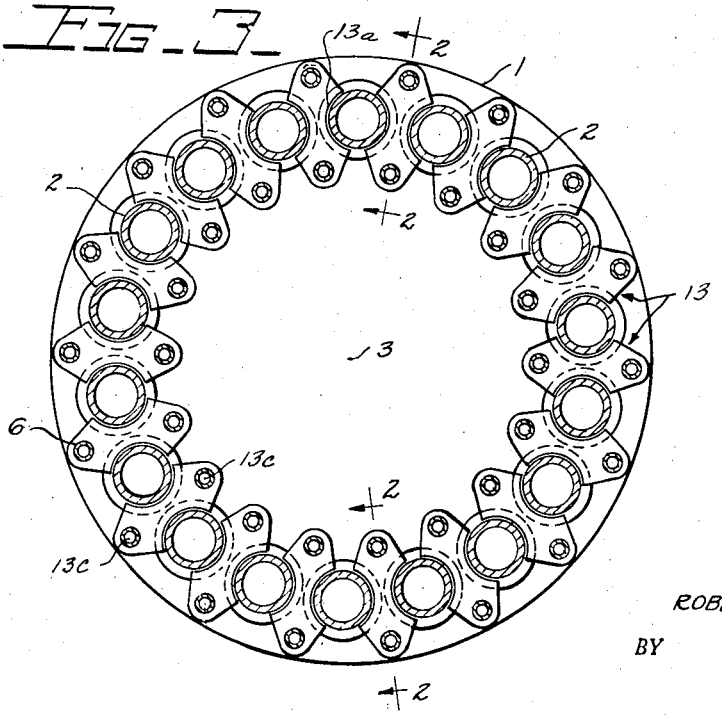
Figure 3 is a partial transverse sectional view taken along 3—3 of Figure 2, illustrating additional details of the gun and recoil system utilized in the invention.

As clearly seen in Figures 2 and 3 of the drawings, the plurality of hydraulic recoil brakes 5 are mounted in pairs on a plurality of mounting brackets 13. Each mounting bracket 13 is positioned between adjacent gun tubes 2 and a pair of brakes 5 are mounted on opposite ends of each of said brackets 13, said pair of brakes 5 constituting an upper and a lower recoil mechanism extending above and below and parallel to the upper and lower surfaces, respectively, of said tube 2. Each of the previously described piston rods 6 is retained in place on the appropriate gun tube 2 by a mounting means including said bracket 13 and also, the additional means of a nut or spacer element 14, a second bracket 15 and a forward ring 17, between the last of which is positioned the counter-recoil buffer 16 as seen clearly in Figure 2 of the drawings. Said bracket 13 has a pair of oppositely disposed circular cut-out portions 13a which are in surrounding relation to a pair of adjacently mounted gun tubes 2 and, also, a pair of holes 13c at opposite ends thereof through which an upper and a lower piston rod 6 extend. Said additional means, likewise, each include a pair of aligned openings or holes of identical diameter through which said pair of piston rods 6 extend. Each of said additional means for retaining said piston rods 6, also, have circular cutout portions in surrounding relation to said gun tubes 2 as clearly seen in Figure 2. In order to retain said bracket 13 in immovable position on said piston rod 6, the latter is reduced in diameter beginning at an intermediate location between the piston 7 and its extreme forward end. This reduction in diameter forms an abutment 13b against which abutment said bracket 13 is held in tight engagement by means of said nut or space element 14, second bracket 15, forward ring 17, and counter-recoil buffer 16. As a result of the above described structural arrangement, the piston rod 6 cannot move relative to said mounting means. Said piston rod mounting means is rigidly engaged with said gun tube 2 in a manner to be described in detail hereinafter.

An important feature of the present invention resides in the fact that the recoil brake cylinder 8 previously described is slidably engaged with said gun tube 2, whereas the piston rod mounting means described above is held in rigid engagement therewith and is both carried to the rear during recoil and returned to battery by means of a circular metallic ring 18 (indicated clearly in Figure 2) formed at an intermediate location on the circumference of said gun tube 2. Said circular ring 18 constitutes means for positively retaining each of said pair of brackets 13, 15 to each tube 2 and thereby requires each pair of piston rods 6 positioned on opposite sides of each tube 2 to move therewith when said tube 2 goes into recoil and to return therewith during counter-recoil. Said means for performing the latter two operations during recoil and counter-recoil is accomplished by the engagement of said ring 18 in the gap formed between said brackets 13 and 15. As seen clearly in Figure 2 of the drawings, the width of said ring 18 is approximately equal to the width of said gap so that said brackets 13 and 15 are in tight fit on opposite sides of said ring 18 eliminating any relative movement therebetween. The buffer 16 serves the purpose of absorbing the lesser shock of counter-recoil when said tube 8 returns to battery. Therefore, since each of said brackets 13, 15 provide support for a pair of piston rods 6 and since each gun tube 2 utilizes a pair of said brackets 13, 15 positioned on opposite sides thereof, each gun tube 2 incorporates a recoil system consisting of four hydraulic recoil brakes 5 to absorb the shock of recoil.

To summarize the operation of the recoil mechanism of the present invention; first, the projectile 11 is fired in one of the tubes 2; second, said tube 2 goes into recoil; and third, the recoil mechanism for each tube 2 consisting of four hydraulic brakes 5 (a pair on each side of said tube 2) becomes effective to resist or absorb the recoil of said tube 2.

Thus, a unique and simple recoil mechanism has been developed wherein the recoil shock of a plurality of gun tubes fired one at a time in alternate succession is effectively absorbed with a minimum of component parts utilized, and a substantial reduction in overall recoil mechanism weight.

I claim:

1. A multiple barrel aircraft gun system consisting of a plurality of gun tubes circumferentially mounted in the nose of an aircraft, and a recoil system for said plurality of gun tubes comprising a pair of pressure-responsive devices mounted between each adjacent pair of said tubes, each of said pair of pressure-responsive devices comprising a pair of recoil brake cylinders independently mounted with relation to said tubes, a piston and piston rod positioned in each of said brake cylinders, and a common air cylinder attached to one end of each of said pair of cylinders in communication therewith, one end of said rod extending into said air cylinder and the other end thereof extending outside of said brake cylinder and fixedly attached to said gun tubes for movement therewith on recoil thereof.

2. In a single shot, multiple gun system, a plurality of guns circumferentially mounted in spaced relation about the axis of a supporting structure, each of said guns consisting of a gun tube adapted to contain a projectile and arranged to fire alternately, and means in operable relation to said tube for absorbing the shock of recoil of said tube subsequently to firing said projectile, said means consisting of a plurality of recoil brakes in surrounding relation to said plurality of tubes, each of said plurality of recoil brakes including a main cylinder, an auxiliary air chamber in communication with said main cylinder, a piston in said main cylinder, a piston rod extending outside one end of said main cylinder longitudinally of said tube and means for affixing an intermediate portion of said piston rod to said tube comprising a piston rod retaining member on said tube and a pair of mounting brackets fixedly positioned on said piston rod, said pair of brackets fixedly attached to said piston rod in spaced relation, said retaining member engaged in the space between said brackets and in contact on opposite sides with each of said pair of brackets to positively engage said tube to said rod to carry said piston rod backward against the resistance of air in said cylinder and chamber to absorb the recoil of said tube and to return the same therewith to its battery position subsequent to said recoil.

3. In a multiple barrel aircraft gun system consisting of a plurality of gun tubes circumferentially mounted in the nose of an aircraft, a recoil system comprising a pair of pressure responsive devices positioned between adjacent gun tubes, each of said pair of pressure responsive devices comprising a recoil brake cylinder, a piston positioned in said brake cylinder and a piston rod having one end affixed to said piston inside of said cylinder and its opposite end extending outside said brake cylinder adjacent a respective gun tube and parallel to the longitudinal axis of said gun tube, and interconnecting means between an intermediate portion of the outside end of said piston rod and said respective gun tube to move said piston rod and said piston inside of said brake cylinder simultaneously with rearward recoil movement of said gun tube.

4. In a single shot, multiple barrel gun system, a main support, a plurality of guns mounted in spaced relation about an axis of said support, each of said guns consisting of a tube arranged to fire alternately, recoil means for absorbing recoil of said tube, said recoil means comprising a pair of recoil brakes mounted between adjacently spaced gun tubes, said pair of recoil brakes consisting of an upper recoil brake, a lower recoil brake radially spaced from said upper recoil brake and mounting means adjacent the forward end of each of said pairs of recoil brakes retaining the forward ends of said respective pairs of recoil brakes in parallel relation between adjacent gun tubes, and means releasably connecting said mounting means to the upper and lower surface, respectively, of each of said gun tubes.

5. In a single shot, multiple barrel gun system, a main support, a plurality of guns mounted in spaced relation about an axis of said support, each of said guns consisting of a tube arranged to fire alternately, recoil means for absorbing recoil of said tube, said recoil means comprising a pair of recoil brakes mounted between adjacently spaced gun tubes, said pair of recoil brakes consisting of an upper recoil brake, a lower recoil brake radially spaced from said upper recoil brake and mounting means adjacent the forward end of each of said pairs of recoil brakes retaining the forward ends of said respective pairs of recoil brakes in parallel relation between adjacent gun tubes, and means releasably connecting said mounting means to the upper and lower surface, respectively, of each of said gun tubes, each of said recoil brakes including a relatively large main cylinder, a piston positioned in said main cylinder and a piston rod affixed at one end to said piston and extending outside of said cylinder at its other end, said last-named end being releasably affixed to said gun tube by said means releasably connecting said mounting means to the upper and lower surface of said gun tube.

6. In a single shot, multiple barrel gun system as in claim 5, and a relatively small common air cylinder sealed to the rear end of adjacent pairs of said main cylinders in restricted open communication therewith to return said pair of gun tubes to battery position, said piston having means on its side opposite said piston rod in substantially confined communication with the restricted open communication of said common air cylinder, said last-named means constituting a continuation of said piston rod on the opposite side of said piston.

References Cited in the file of this patent

UNITED STATES PATENTS

| | | |
|---|---|---|
| 2,088,592 | Gurney | Aug. 3, 1937 |
| 2,433,637 | Trotter | Dec. 30, 1947 |
| 2,715,856 | Kramer et al. | Aug. 23, 1955 |
| 2,790,357 | Garrett | Apr. 30, 1957 |
| 2,792,754 | Walker | May 21, 1957 |

FOREIGN PATENTS

| | | |
|---|---|---|
| 635,955 | Germany | Sept. 28, 1936 |